March 6, 1945.  A. SIMMON ET AL  2,371,072
PHOTOGRAPHIC SHUTTER
Filed Jan. 29, 1944   6 Sheets-Sheet 1
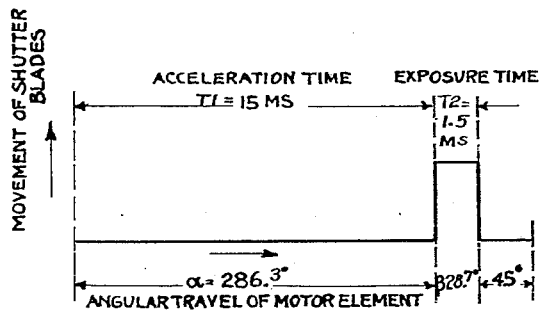
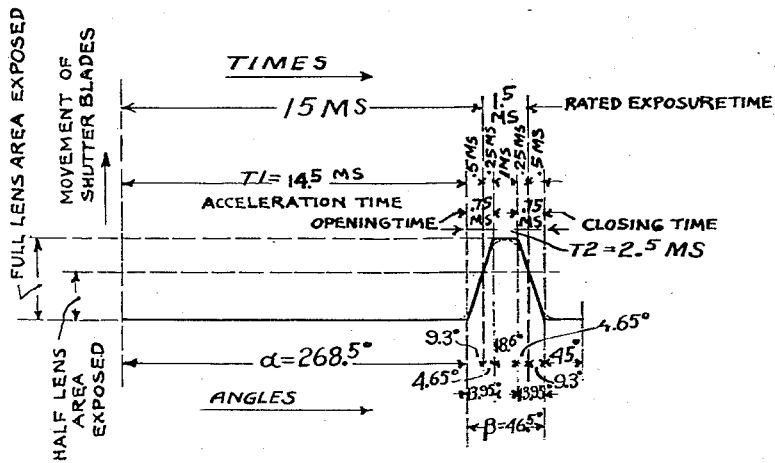
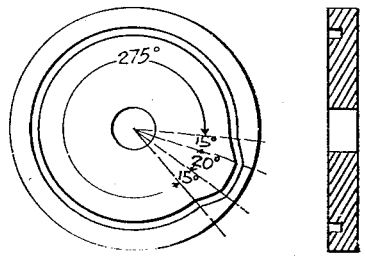
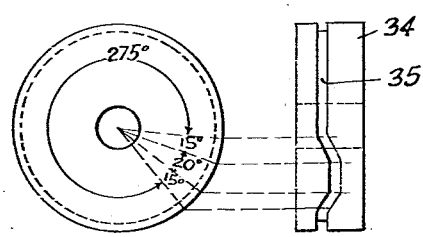
Alfred Simmon
Louis L. Weisglass
INVENTORS
BY Walter E. Wollheim
ATTORNEY March 6, 1945.   A. SIMMON ET AL   2,371,072
PHOTOGRAPHIC SHUTTER
Filed Jan. 29, 1944   6 Sheets—Sheet 2
Fig: 5
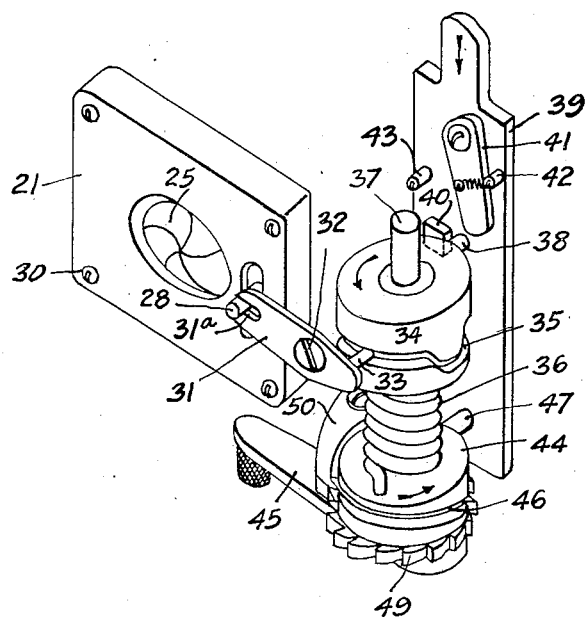
Alfred Simmon
Louis L. Weisglass
INVENTORS.
BY *Walter S. Wallheim*
ATTORNEY March 6, 1945. A. SIMMON ET AL 2,371,072
PHOTOGRAPHIC SHUTTER
Filed Jan. 29, 1944 6 Sheets-Sheet 3
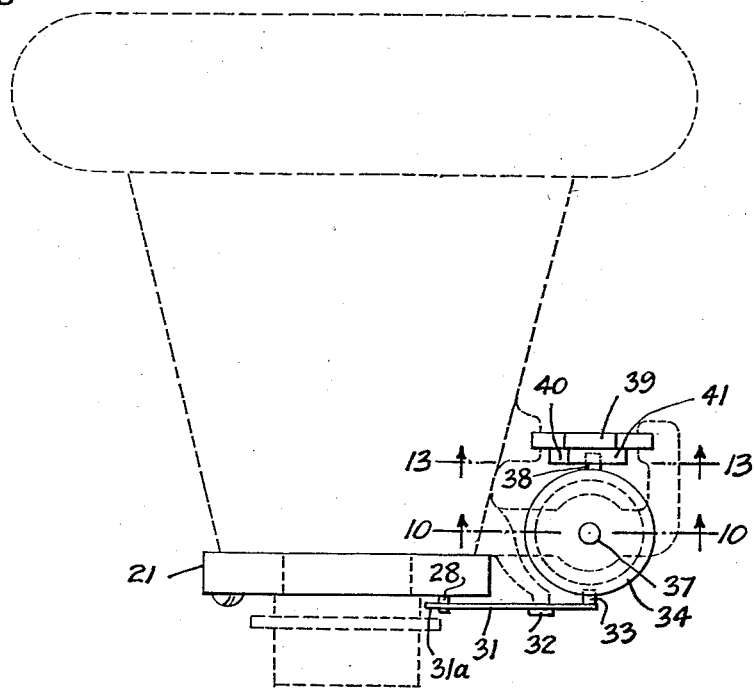
Fig:6
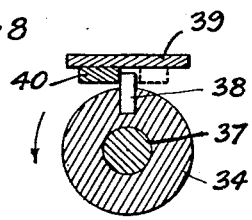
Fig:8
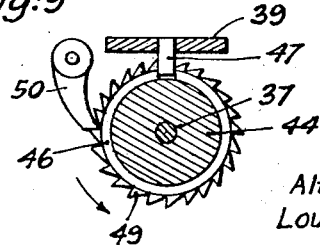
Fig:9
Alfred Simmon
Louis L. Weisglass
INVENTORS
BY Walter E. Wollheim
ATTORNEY.

March 6, 1945.   A. SIMMON ET AL   2,371,072
PHOTOGRAPHIC SHUTTER
Filed Jan. 29, 1944   6 Sheets-Sheet 4
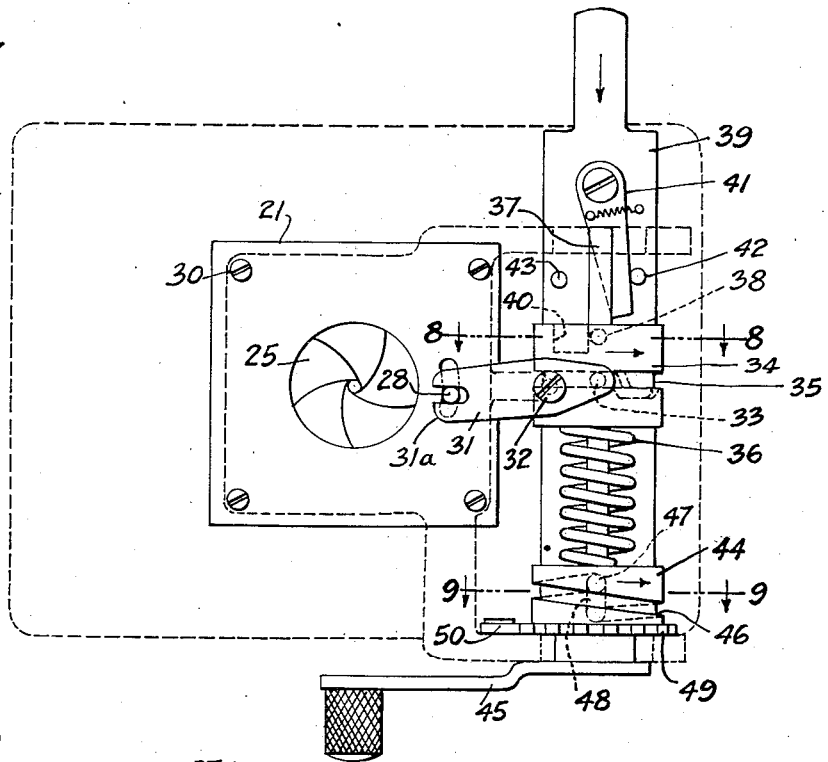
Fig:7
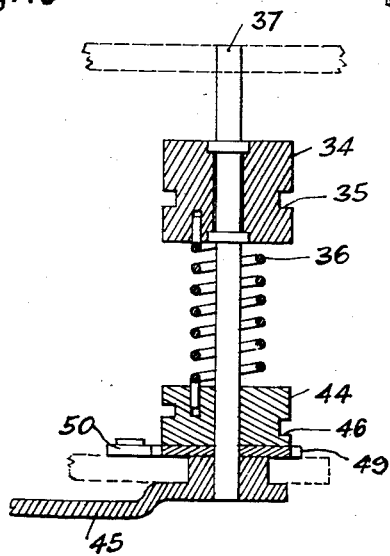
Fig:10
Alfred Simmon
Louis L. Weisglass
INVENTORS.
BY Walter E. Wollheim
ATTORNEY.

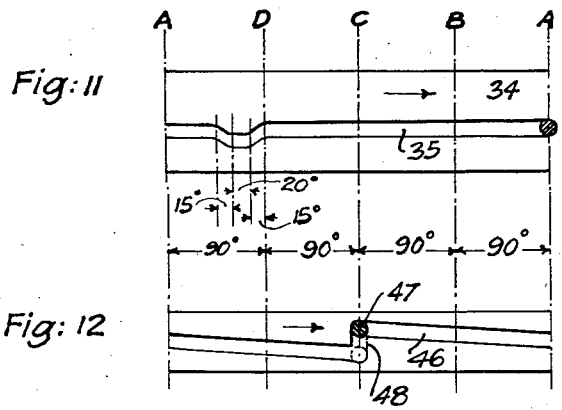
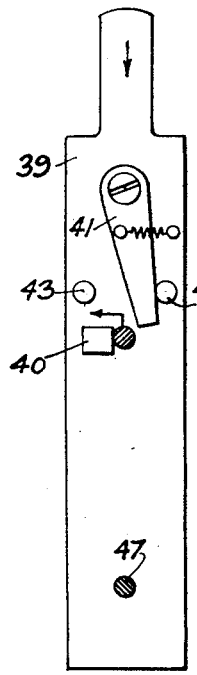
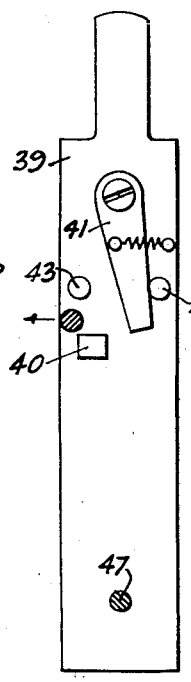
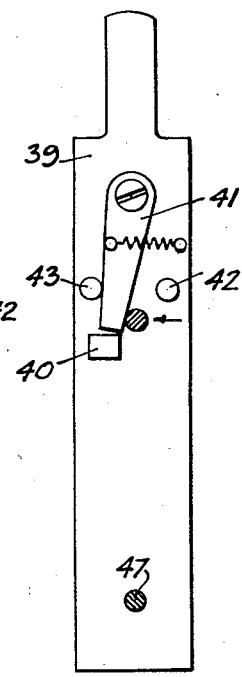

March 6, 1945.   A. SIMMON ET AL   2,371,072
PHOTOGRAPHIC SHUTTER
Filed Jan. 29, 1944   6 Sheets-Sheet 6
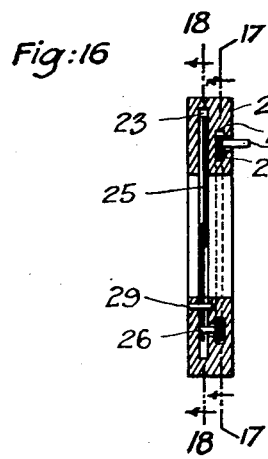
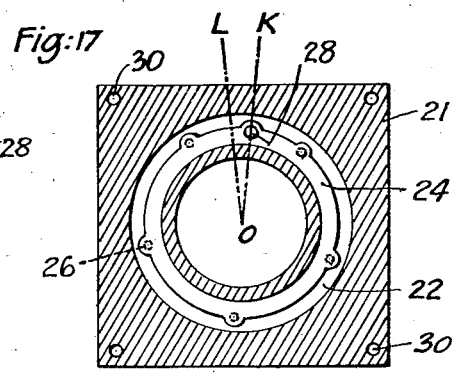
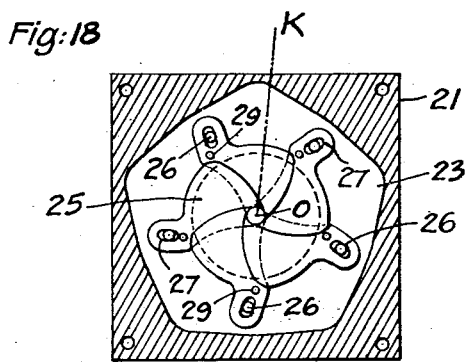
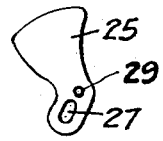
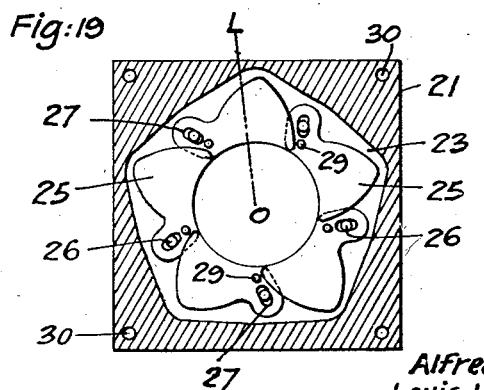
Alfred Simmon
Louis L. Weisglass
INVENTORS
BY Walter E. Wallheim
ATTORNEY.

UNITED STATES PATENT OFFICE 2,371,072

PHOTOGRAPHIC SHUTTER

Alfred Simmon, Jackson Heights, and Louis L. Weisglass, New York, N. Y.; said Weisglass assignor to said Simmon Application January 29, 1944, Serial No. 520,182

5 Claims. (Cl. 95—63)

The purpose of this invention is to provide a photographic shutter which is of simple construction, which has a higher speed than heretofore possible, and which can be used with photoflash lamps without the aid of a special synchronizer. It is a so-called "lens shutter," i. e., its light admitting element is positioned either between the elements of a photographic objective or immediately in front or, preferably, in back of it, as distinguished from a so-called focal plane or curtain shutter, the light-admitting element of which is positioned immediately in front of the sensitized surface of the photographic film.

A typical lens shutter consists of a housing, a number of pivoted shutter blades, a blade ring opening and closing the blades in unison, a spring driven rotating motor element, sometimes called the master element, and a connecting link by means of which the rotary motion of the motor element is made to cause a reciprocating motion of the blade ring, thereby opening and closing the blades. Shutters of this general type are commercially available with a rated speed of $\frac{1}{400}$ of a second, but by actual measurement few, if any, are really as fast as $\frac{1}{200}$ of a second.

In analyzing the various possibilities to increase the shutter speed, not many promising means are found by which this can be achieved. Basically one could either decrease the inertia of the system or one could increase the force or energy by which this system is driven. All possibilities to decrease the inertia of the system have been exhausted long ago and no further substantial improvement in this direction seems possible. The shutter blades are customarily made from very thin (.002") blue tempered spring steel. They cannot be made thinner because no thinner material can be procured, and even if it could be procured, it would lack rigidity. Other materials such as plastics or the light weight metals have a less favorable strength to weight ratio than spring steel. Attempts to eliminate the blade ring or the link connecting the blade ring to the motor element are a misdirected effort. The angular velocity of these elements is low and, consequently, their contribution to the inertia of the whole system amounts usually to not more than twenty percent. Their total elimination would, therefore, at best increase the shutter speed by less than ten percent.

If it is desired to increase the driving force, one can employ a stronger spring. This, again, is not a very promising approach because in order to double the shutter speed one would have to quadruple the force of the spring. As a matter of fact, even this would result in considerably less than double speed because the spring itself would become considerably heavier and has to accelerate part of its own weight. If, in addition, the other parts of the shutter have to be strengthened in order to withstand the increased spring force, the inertia of the whole system will again increase so that most of the expected gain will be lost.

However, the energy available to operate the shutter can be increased in a different manner, i. e., by giving the motor element deliberately a relatively high momentum of inertia, and permitting a small, but measurable, time interval to elapse between the time the motor element is released and the time it opens and closes the shutter blades. During this time interval the motor element of relatively high inertia will become accelerated by the spring, storing in this manner a large amount of energy which will then be available to operate the blades very rapidly. This principle is used in the shutter forming the subject matter of his application. We are aware of the fact that this train of thought is not entirely new and that various designs have been suggested by means of which the motor element of the shutter was given a certain time for acceleration before operating the blades, but we shall demonstrate later on that the magnitude of the necessary acceleration time was not correctly estimated and that, consequently, the means suggested heretofore to this end were wholly inadequate.

The length of the time interval between the release of the motor element and the operation of the shutter blade would appear to be largely a matter of good judgment. To provide a very short acceleration time would, of course, deprive one of most of the expected benefits, but too long an interval would also be objectionable since it would, for example, render the photography of fast moving objects difficult. In practice, however, one is very narrowly restricted in the choice of this time interval by the fact that all present cameras must be applicable to flashlight photography. A flash lamp consists of a glass vessel containing a combustible substance, usually aluminum or magnesium in an oxygen atmosphere. An electric filament is provided by means of which the combustible substance can be ignited. A typical flash lamp of this type shows a time lapse of approximately 15 milliseconds between the time the circuit is closed and the time the lamp approaches its maximum light emission. It is, therefore, logical to choose approximately this magnitude, i. e., 15 milliseconds, as the time which shall be allowed for the acceleration of the motor element of the shutter because in this manner a so-called synchronizer can be dispensed with. Heretofore, photographic shutters began to open with practically no time lag at all and were fully open after 2 to 5 milliseconds. Consequently, for flash lamp photography, an additional time lag had to be introduced by means of a mechanical device called a synchronizer which closed the electric circuit for the flash lamp and opened the shutter in the proper sequence so that the maximum light emission of the lamp took place when the shutter was fully opened. Obviously, it is not a very logical design to open a shutter sooner than necessary, thereby limiting its speed, and then to introduce, artificially, by means of a synchronizer, an otherwise quite useless time lag, thereby wasting precious time which could more profitably be used for the acceleration of the shutter, and for increasing its speed.

There are now presented a few simple computations which are very important for the full understanding of our invention. Let us assume the simplest case of a motor element which makes one full revolution for each exposure. Let us further assume that we wish to introduce a time lag of 15 milliseconds between the release of the motor element and the opening of the shutter, and that we want an exposure time of 1½ milliseconds or 1/666 of a second. While this is not the fastest time which can be obtained, it is a speed which can be obtained without going to extremes and which is sufficient for most practical purposes.

The operation of the motor element can be divided into three periods. During the first period the shutter blades remain closed and the spring merely accelerates the motor element. During this period the motor element performs, with a very high degree of approximation, a simple uniformly accelerated motion and friction is a negligible factor.

During the second period, the motor element opens the blades, keeps them open for a certain length of time and closes them again. The movement of the motor element and of the other shutter parts during this period is much less predictable than during the first period. Regardless of the detailed construction of the device, the motor element must make some contact with the blade ring and the pivoted blades. The momentum of inertia of the whole system will be increased thereby, and the motor element will, consequently, lose some of its speed. During the short period during which the blades are held open, the motor element will become again somewhat accelerated, but it will lose speed again during the closing movement of the blades. Depending upon the mechanical means employed, there may also be considerable friction and sometimes even shock and vibration during this period. Obviously, the movement of the motor element during this second period does not follow any simple law, and we must, therefore, make some simplifying assumptions in order to predict its behavior with some degree of approximation. The simplest assumption, and one that checks quite well with actual experience, is to ascribe a simple uniform angular velocity to the motor element during this period. This velocity can be estimated by computing the final velocity which the motor element reaches at end of the first period of uniformly accelerated motion, and then making a reasonable allowance for the loss of speed suffered during the second period. How large the loss of speed during this period will be depends, therefore, to some extent upon the mechanical perfection of the system, but largely upon the relative momentum of inertia of the motor element and of the shutter blades respectively.

If we designate the momentum of inertia of the fly wheel $I$, the momentum of inertia of each shutter blade $I_1$, the number of shutter blades $n$, the momentum of inertia of the blade ring $I_2$, the momentum of inertia of the connecting lever $I_3$, and $\omega$, $\omega_1$, $\omega_2$, $\omega_3$ the respective angular velocities, then this loss of speed will be relatively small if we make $I$ relatively large as compared to $$nI_1\left(\frac{\omega_1}{\omega}\right)^2 + I_2\left(\frac{\omega_2}{\omega}\right)^2 + I_3\left(\frac{\omega_3}{\omega}\right)^2$$

By actual experiments, we find that by making the inertia of the motor element fairly large, it is possible to reduce the speed loss so that it will amount to a little less than half of the speed which the motor element would theoretically attain without the shutter blades. For the following computation we shall, therefore, assume that the motor element, during the second period, has a uniform angular velocity equal to half the angular velocity reached at the end of the first period.

During the third period, the shutter blades are closed and remain closed and a certain angle is provided merely for stopping the motor element. An angle of approximately 45° is ample for this purpose.

We have, therefore, the following conditions: During the first period the motor element rotates and gathers speed. The total time for this period is $T_1=15$ milliseconds, the angle traveled during this period is $\alpha$, the uniform angular acceleration is $\epsilon$, and the angular velocity at the end of this period is $\omega_1$. We have then the following relations:

$$\alpha = \frac{1}{2}T_1^2\epsilon$$

and $$\omega_1 = \epsilon T_1$$

During the second period we assume that the motor element rotates with a uniform angular velocity $\omega_2$, which shall be one half of the previously reached velocity $\omega_1$. The angle covered in this period shall be $\beta$, and the elapsed time $T_2=1.5$ milliseconds. We have $$\beta = \omega_2 \cdot T_2$$
$$= \frac{1}{2}\omega_1 T_2 = \frac{1}{2}\epsilon T_1 T_2$$

The sum $\alpha+\beta$ is 315°, leaving 45° for stopping the rotating motor element. We can now compute $\epsilon$, $\omega_1$, $\omega_2$, $\alpha$, and $\beta$.

$$\alpha+\beta = \frac{1}{2}T_1^2\epsilon + \frac{1}{2}T_1T_2\epsilon = 315°$$

$$\frac{1}{2}\cdot 15^2\epsilon + \frac{1}{2}15\cdot 1.5\epsilon = 315°$$

$$\epsilon = {}^{315}/_{112.5+11.25} = 2.55$$

$$\omega 1 = \epsilon \cdot T_1 = 2.55 \cdot 15 = 38.25 \text{ degrees/millisec.}$$

$$\omega 2 = \frac{1}{2}\omega 1 = 19.12 \text{ degrees/millisec.}$$

$$\alpha = \frac{1}{2}\cdot 15^2 \cdot 2.55 = 286.3°$$

$$\beta = 19.12 \cdot 1.5 = 28.7°$$

Fig. 1 shows a diagram in which the movement of the blades is plotted in relation to the angular travel of the motor element. It will be clear that this diagram does not fully reflect actual conditions since it assumes that the shutter opens and closes in an infinitely short time. In reality, of course, a very definite and measurable time is being consumed for this purpose, and we shall have to modify the diagram accordingly in order to portray more truly actual conditions. For this purpose we have to keep in mind the following three facts:

First, we shall follow the commonly accepted method of rating shutters according to which the nominal exposure time is the time elapsed between the instance when the shutter blades expose half the lens area during the opening movement and the instance when the shutter is half closed again during the closing movement.

Second, the time needed to open or close the shutter blades amounts to approximately .75 millisecond. This has been verified by actual measurements and, while this again is not the fastest possible speed for this movement, it is one that can be obtained without imposing too much strain upon the blades due to excessive acceleration.

Third, approximately two-thirds of this time or .5 millisecond elapse between the actual begining of the opening movement and between the exposure of half the lens area. Approximately the same conditions prevail during the closing movement of the blades.

Based on these three conditions we can define the diagram which is now shown in Fig. 2 and which reflects actual conditions with a good degree of approximation. The elapsed time from the shutter release until the time the shutter, during the opening movement, is half open is 15 milliseconds, and the elapsed time between this moment and when the shutter is half closed again during the closing movement is 1.5 milliseconds. With the assumptions made above, this means that 14.5 milliseconds ($=T_1$) elapse from the release of the shutter to the beginning of the opening movement, and that the entire exposure producing movement lasts 2½ ($=T_2$) milliseconds. The rotor, during the time $T_1$ covers the angle $\alpha$, and during $T_2$ the angle $\beta$. The sum of $\alpha+\beta$ shall again be 315°. $\alpha$ and $\beta$ can now be computed in the same manner as above, with the following results:

$$\alpha+\beta=\frac{1}{2}\epsilon T_1^2+\frac{1}{2}\epsilon T_1 T_2 = 315°$$

$$\frac{1}{2}\epsilon \cdot 14.5^2 + \frac{1}{2}\epsilon \cdot 14.5 \cdot 2.5 = 315°$$

$$\epsilon = 2.555$$

$$\omega_1 = 14.5 \cdot 2.555 = 36.98 \text{ degrees/millisec.}$$

$$\omega_2 = \frac{1}{2}\omega_1 = 18.49 \text{ degrees/millisec.}$$

$$\alpha = \frac{1}{2} \cdot 14.5^2 \cdot 2.555 = 268.5°$$

$$\beta = 18.49 \cdot 2.5 = 46.5°$$

Since we assumed uniform speed during the exposure producing movement, the various parts of this movement cover angles in direct proportion to the assumed elapsed times, or the angle for the opening movement, which lasts .75 millisecond, is $.75/2.5 \cdot 46.5 = 13.95°$. The angle for the closing movement is the same. These angles and times are shown in Fig. 2. The only further modification would be the rounding off of the sharp corners, since sharp corners would theoretically mean infinitely high accelerations at these points which, of course, is impossible. These rounded corners are shown in dotted lines.

The theoretical considerations in the preceding paragraphs are quite broad and apply in general to any mechanical system actuating the shutter in this manner regardless of the detailed construction of this system which have not as yet been discussed. The simplest way to perform such a movement is by means of a rotating cam of proper proportions which then, either directly or through suitably interposed connecting elements, actuates the blade assembly. In Figs. 3 and 4, two possible forms of these cams are shown. Fig. 3 shows a flat cam and Fig. 4 shows a cylindrical cam. Theoretically, the two types are equally good, but we prefer the cam shown in Fig. 4 because it has important practical advantages. Its axis is disposed at right angles to the axis of the lens, which makes it more convenient to provide sufficient space for the spring and for other elements associated with the rotating cam. It has the further advantage that the cam shaft of the motor element can be made parallel to the axis of the film spools so that it will be quite easy to connect the two by well known means, such as a chain drive or idler gears, so that the advancement of the film and the tensioning of the shutter can be performed simultaneously.

We want to call attention to the configuration of these cams, particularly to the unusually long 275° straight portion which in operation precedes the cam abutment of trapezoid shape. This straight portion which permits the acceleration of the motor element for 15 milliseconds without the opening of the shutter proper is almost six times as long as the trapezoid cam element which deflects the pivoted shutter blades, thereby opening and closing them. This proportion is most important, and the fact that we have provided mechanical means permitting these proportions is a chief distinction of our invention as compared to other shutter designs proposed heretofore. The necessity for these proportions which alone make it possible to construct a shutter which not only provides high shutter speed, but which also functions in connection with standard flash lamps without a special synchronizer, has apparently never been realized by other inventors and, consequently, the few who provided means for the acceleration of the motor element at all did so in a wholly inadequate way.

We wish to emphasize that it is not merely a question of using some means already proposed by others and changing their proportions in order to provide the theoretically desirable time relations explained above, because the mechanical means heretofore suggested were of such a nature that with them it was physically quite impossible to provide time relations and spatial proportions such as we find necessary and desirable.

It has, for example, been suggested to provide a cam which is concentric with and which surrounds the camera lens, this cam being equipped with a cam groove with five abutments which in operation open and close individually the five pivoted shutter blades. With this design, the straight portion of the cam groove preceding each abutment cannot be made longer than approximately twice the length of the abutment, thereby either providing an acceleration time which is far too short for our purposes, or if this acceleration time is assumed to be long enough for synchronization purposes, the fastest exposure time of the shutter would be very long indeed. This cannot be changed because the proportions of any cam groove are not at all arbitrary, but are severely limited by several considerations: The width of the cam groove cannot be reduced below a certain minimum, because otherwise the cam following pin which, in turn, operates, one or all of the blades, becomes too thin and will break. The front of the trapezoid cam abutment cannot be too steep because then, again, the cam following pin would rather break off than be deflected. The straight part of the trapezoid cam abutment which determines the "dwell period" or the time during which the shutter stays fully open cannot be arbitrarily shortened, because this would unduly restrict the light admittance of the shutter. The height of the trapezoid cam abutment cannot be reduced below a certain minimum, since otherwise the movement caused by it would have to be mechanically too much amplified, for example, by a suitably proportioned connecting lever between motor element and blade assembly, and the system would become so exceedingly sensitive that small inaccuracies of the cam shape, or even dust specks, might cause a partial opening of the blades during the acceleration period. Due to these and other considerations, we found that with our own construction we have to use a cam of a mean diameter of almost 1", or the length of the cam groove must be approximately 3". This is still a tolerable dimension, but a quintuple lens surrounding cam having approximately the same proportions would require a mean diameter of 5" so that the length of the cam groove available for each blade movement would again be approximately 3". Manifestly, a cam diameter of 5" is absurd and for a shutter of 1" aperture, the diameter of the cam groove could, in reality, be hardly more than 1½" or less than one-third of what it ought to be in order to achieve conditions as favorable as ours.

Other designs which have been proposed and which similarly provide at least some acceleration time for the motor element are still less adequate. A Geneva movement, for example, has been suggested which requires approximately 90° travel of the motor element for its operation. This shutter provides an acceleration angle of the motor element of 100° or, in other words, the acceleration angle is hardly larger than the angle required for the operation of the blade assembly. It will be clear that the acceleration time afforded in this manner will be much too small to be really effective.

Therefore, we want to emphasize that we believe ourselves to be the first ones who have clearly realized the essential time relations desirable for a high speed shutter which may be operated with flash lamps without the aid of a synchronizer, and that we have provided novel mechanical means which are not only simpler but which are for the first time really capable of operating a shutter in this projected manner, whereas other means proposed heretofore cannot be altered sufficiently in their proportions to make this possible.

A preferred embodiment of a shutter embodying the principles of our invention is shown in the accompanying drawings in which Fig. 1 is a diagram of the movement of the shutter blades in relation to the angular travel of the motor element for an ideal shutter;

Fig. 2 is the same diagram modified so as to allow sufficient time for the opening and closing movement of the blades;

Fig. 3 shows a front as well as a cross-sectional view of a flat cam; and

Fig. 4 shows a front and a side view of a cylindrical cam.

In Figs. 3 and 4, the numerical values of the angles shown have been rounded off in order to simplify manufacturing. These round figures, however, do not vary greatly from the angles computed above and this discrepancy is so slight that the working function of the device is not materially affected thereby.

Figs. 1 to 4, inclusive have already been referred to in the preceding text.

Fig. 5 illustrates the working elements of the shutter in axonometric projection, the supporting structure and other non-essential elements having been omitted;

Fig. 6 is a plan view of a camera equipped with our shutter, the camera being shown in dotted lines diagrammatically only;

Fig. 7 is a front elevational view of the assembly shown in Fig. 6;

Fig. 8 is a horizontal cross-sectional view along the plane of line 8—8 in Fig. 7;

Fig. 9 is a horizontal cross-sectional view along the plane of line 9—9 in Fig. 7;

Fig. 10 is a vertical longitudinal cross-sectional view taken along the line 10—10 in Fig. 6 showing details of the motor element;

Fig. 11 is a development of the actuating cam of the motor unit; the angles are again, in the interest of simplified manufacturing, shown in round figures;

Fig. 12 is a development of the cam used for sequence control;

Fig. 13 is an elevational view of the release mechanism, partly in section, along the plane of line 13—13 in Fig. 6, prior to exposure;

Fig. 14 is a view similar to that shown in Fig. 13 when the shutter is released;

Fig. 15 is a view similar to that shown in Fig. 14 after the motor unit has made one complete revolution;

Fig. 16 is a longitudinal view through the blade assembly in the plane of the optical axis of the camera lens;

Fig. 17 is a cross-sectional view along the plane of line 17—17 in Fig. 16 showing the blade actuating ring;

Fig. 18 is a cross-sectional view along the plane of line 18—18 in Fig. 16 showing the five pivoted blades in a closed position;

Fig. 19 is a view similar to that shown in Fig. 18 with the blades in an open position; and Fig. 20 is a view of a single shutter blade only.

Like numbers of reference denote similar parts throughout the several drawings and the following specification.

The shutter consists of the following subassemblies:

1. Blade assembly.
2. Connecting lever transmitting motion from motor unit to blade assembly.
3. Motor unit.
4. Release mechanism.
5. Rewinding mechanism and sequence control.

We shall describe the subassemblies in this order.

Blade assembly

Referring to Figs. 16 to 20, the blade assembly consists of a housing, five pivoted shutter blades and a blade actuating ring. While the housing is shown as of one piece construction, it will, of course, be understood that in reality it will be suitably sub-divided so as to permit the insertion of the blade ring and the shutter blades. As can be seen in Fig. 16 the housing 21 has two annular cavities 22 and 23 which contain a blade actuating ring 24 and pivoted shutter blades 25, respectively. The blade actuating ring 24 is equipped with five pins 26 extending rearwardly, see Fig. 17, so as to engage through suitable openings in the housing, slots 27 of the shutter blades 25. The ring is also equipped with a somewhat stronger pin 28 which extends through a slot of housing 21. It is the purpose of pin 28 to connect the blade assembly with the motor element either directly or through a suitable connecting link which will be described later. The shutter blades 25 have the configuration shown in Fig. 20. They rotate on pivots 29. The housing 21 is equipped with four holes 30 so that it can be conveniently fastened to the camera body.

The operation of the blade assembly is, of course, quite simple. When the shutter is closed, an imaginary line connecting the center of the aperture and the center of pin 28 assumes the position O—K. During the operation the blade actuating ring makes a small oscillatory movement, i. e., line O—K moves into the position O—L and back. The five pins 26 participate in this movement, and since these pins engage slots 27 of the pivoted shutter blades, these shutter blades perform rotary movements around pivots 29, thereby opening the shutter as shown in Fig. 19 and closing it again as shown in Fig. 18. The entire blade assembly is of conventional design and the various elements are well known. Its detailed description has been included in this specification merely in the interest of completeness.

*Connecting lever transmitting motion from motor unit to blade assembly*

This blade assembly can cooperate directly with a motor unit if so desired without the interposition of any connecting link. In other words, pin 28 may directly engage the groove of a cam similar to the one shown in Fig. 3 or 4. In practice, however, we prefer to have a lever interposed between pin 28 and the cam of the motor unit. It will then be possible to amplify the cam motion mechanically or, in other words, the height of the trapezoid cam abutment can be correspondingly reduced which will result in a less steep angle of the cam element which is in many respects advantageous. A suitable connecting lever 31 can be seen in Figs. 5 and 7. The lever 31 turns on a fixed pivot 32 which is supported by the camera body, as shown in Fig. 6, and supports a pin 33 on one end. Pin 33 in turn engages the cam groove. The other end of the lever 31 has a slot 31a which actuates pin 28 of the blade assembly. By making the distance from the fixed pivot 32 to the cam following pin 33 smaller than the distance from the fixed pivot 32 to pin 28 of the blade assembly the desired mechanical amplification of the cam movement can be accomplished. A ratio of 1:2 or even 1:3 can be obtained in this manner without difficulty. In the drawings the fixed pivot 32 has been shown as being positioned between cam following pin 33 and pin 28 of the blade actuating ring, but it will be understood that we can also position the fixed pivot 32 on one side of pin 33 and 28. In other words, instead of a two-armed lever as shown, we can use a one-arm lever and obtain the same results. The one-armed lever may sometimes be advantageous and its application should fall within the scope of this invention.

*Motor unit*

The motor unit consists of a flywheel 34 with its associated cam groove 35, spring 36 and supporting shaft 37.

The supporting shaft 37 is fixedly fastened to the camera housing, and flywheel 34 is rotatably mounted on this shaft. One end of spring 36 is fastened to flywheel 34, and the other end of this spring is fastened to a rewinding device which will be described later. Cam groove 35 cooperates, of course, with pin 33 of connecting lever 31, but as explained above, it is perfectly possible to have this cam groove directly engage pin 28 of the blade actuating ring. The shape of the cam groove 35 is shown in development in Fig. 11. It follows very closely Fig. 2 or Fig. 4.

A pin 38 is fastened to flywheel 34. This pin cooperates with the release mechanism which we shall describe now.

*Release mechanism*

The release mechanism is shown in Figs. 8, 13, 14 and 15 and consists of a vertically slideable plate 39 to which are fastened a rectangular block 40 and a spring biased lever 41. The movement of this lever is restricted by separate stops 42 and 43. In Fig. 5, one of the spring supporting posts is shown as movement restricting stop 42. Before the exposure, plate 39 assumes the position shown in Figs. 5, 7 and 13, as can be seen, any movement of pin 38 and, therefore, any rotation of the flywheel 34 is made impossible by block 40. In order to release the shutter, the operator depresses plate 39 in a direction shown by an arrow, which makes it possible for pin 38 to bypass block 40 as shown in Fig. 14. The motor unit can now make a full revolution, at the end of which pin 38 assumes the position shown in Fig. 15. It hits lever 41 and moves it from the position shown in Figs. 13 and 14 into the new position shown in Fig. 15. By means to be described later, plate 39 will be returned to its original position shown in Fig. 13, whereupon pin 38 resumes its relative position with respect to block 40 and, so far as the release mechanism is concerned, the shutter is ready for a new exposure. Instead of the spring biased lever 41, a fixed abutment of similar shape could be fastened to plate 39. We prefer, however, the construction shown because with the fixed abutment a certain small angle would be lost and the flywheel would perform a little less than one revolution, perhaps 345° instead of 360°. The spring biased lever has the added advantage that it softens the shock with which pin 38 is hitting the lever.

*Rewinding device and sequence control*

In Fig. 7 we have shown that one end of the main spring 36 is fastened to flywheel 34, whereas the other end is fastened to the rewinding mechanism. It is an advantage of this design that the spring can be rewound in an exceedingly simple manner by merely giving its other end one revolution so that no special provisions have to be made to prevent opening of the shutter during the rewinding period. As can be seen in Fig. 7, the other end of spring 36 is fastened to a cylindrical part 44 which can be rotated in the direction shown by an arrow by means of crank 45. The cylindrical part 44 is equipped with a cam groove 46 of peculiar shape, the purpose of which will be explained immediately.

Even a perfunctory analysis of the functioning of this type of shutter will show that it is imperative that it be equipped with an automatic sequence control which makes it impossible to rewind the spring unless the shutter has been released, or to release the shutter unless the spring has been rewound. Without such sequence control, the operator could make several exposures with steadily decreasing spring tenison, or he could wind the spring several times without making an exposure, thereby increasing its tension unduly. In any event, without a sequence control the speed of the shutter would not necessarily be what the operator assumes it to be. Devices of this type have been frequently proposed, but most of them have been quite complicated and compare, therefore, unfavorably with the exceedingly simple device which we are about to describe.

As can be seen in Figs. 9, 13, 14 and 15 the sliding plate 39 is equipped with a pin 47. This pin engages the aforementioned cam groove 46 of the rewinding device. This cam groove is shown in Fig. 7 and again in developed form in Fig. 12. It consists essentially of a one revolution helix with a straight connecting part which we shall designate as 48. In the position shown in Fig. 7, it is manifestly possible to depress plate 39 since pin 47 can be moved downwardly in groove 48 without any difficulty. The movement of plate 39 is so designed that a certain amount of friction is present. This can be done in many well known ways; for example, a spring biased friction pad made from fibre or Bakelite may press against plate 39 in a suitable place. Devices of this type are well known and are, therefore, not included in the drawings. The consequence of this friction is that once plate 39 is depressed, it stays depressed, thereby preventing any repeated shutter release. With reference to Fig. 12, pin 47 assumes now a position at the bottom of groove 48 as shown in dotted lines, and it will be clear that the operator can now, by means of hand crank 45, rotate part 44 with the associated cam groove in the direction of the arrow shown in Fig. 12, thereby rewinding the spring and slowly lifting release plate 39 into its original position as shown in Fig. 13. At the end of one revolution of crank 45, pin 47 will again assume the position shown in solid lines in Fig. 12 and will now block any further rotation of crank 45 and part 44. In order to make the design fool-proof, a ratchet 49 cooperating with the pawl 50, see Fig. 9, has been added. This will make it impossible for the operator to reset the shutter partially and then return the crank into the starting position.

It will be clear that this system of sequence control is exceedingly simple and that due to the peculiar shape of cam groove 46, pin 47 and, therefore, release plate 39 can be depressed only after the spring has been rewound, and crank 45 can be rotated for one revolution only after release plate 39 has been depressed, thereby releasing the shutter.

From the foregoing description the operation of the shutter can be fully understood but in the interest of clarity we want to give the following brief summary of its operation:

The operator depresses plate 39. This enables pin 38 to bypass block 40 which is fastened to plate 39. Pin 38 is fastened to fly wheel 34 of the motor unit which can now make one full revolution. Fly wheel 34 is equipped with a cam groove 35 consisting of a long straight portion and a short trapezoid abutment. The cam groove engages pin 33 of lever 31, the other end of which engages pin 28 of the blade assembly. For the first 270°, i. e., for the length of the straight portion of the cam groove preceding the trapezoid cam abutment, the shutter remains closed, but the fly wheel becomes accelerated and a high amount of kinetic energy is thereby stored. This period lasts approximately 15 milliseconds which time was chosen because it is the time delay of a standard photo-flashlight. After this period the trapezoid cam abutment passes pin 33, thereby deflecting it first downwardly, keeping it down for a short period of time, and then moving it upwardly again. In our example, this takes place in approximately 2½ milliseconds. The other end of lever 31 performs a correspondingly oscillatory movement which is somewhat amplified since the distance from the fixed pivot 32 to the cam following pin 33 is smaller than the distance from the fixed pivot 32 to the end of the lever cooperating with the blade assembly. As we have seen above, a small oscillatory movement of the blade actuating ring 24 causes the pivoted shutter blades 25 to rotate sufficiently to open the shutter, keep it open for a certain length of time and close it again. After the exposure, pin 47 fastened to release plate 39 is at the bottom of the straight portion of the cam groove 46 of the sequence control cam. It is, therefore, possible to rotate crank 45 one revolution, thereby retensioning the spring and returning release plate 39 to its original position.

For sake of clearness, the various parts of the camera which do not form part of this invention are shown diagrammatically only in dotted lines in Figs. 6 and 7. In Fig. 6, the lens is shown as mounted immediately in front of the blade assembly, but as explained above, other arrangements are equally feasible, such as arranging the blade assembly between the elements of the photographic lens, or even in front of the lens. In Fig. 7, the lens has been omitted in order to show the blade assembly without obstructions. The motor unit and the release mechanism are shown as mounted on one side of the camera, but they could, of course, be mounted horizontally above or below the lens should this appear expedient for some reason. The motor unit would, in reality, have to be protected by a suitable housing which again is not shown in the drawings. It will also be understood that various component parts of the camera shutter proper have been omitted since they do not form part of this invention. For example, we have shown no provision for making time exposures and we have not shown any speed control, i. e., any device by means of which exposures slower than the maximum speed can be accomplished. Devices of this type are well known in the art and since they do not form part of this invention we have not shown them.

It will be understood that this invention is susceptible to wide modifications, some of which have already been mentioned. For example, instead of the cylindrical cam which we prefer, a flat cam such as shown in Fig. 3 may be used. Instead of frictional means to keep release plate 39 depressed after an exposure, other means may be used, such as a spring which is being forced beyond a dead center. Instead of the torsion spring made from round wire which we have shown, a flat spiral spring such as used in clock works may be used. The connecting lever may be either of the two-armed type, as shown, or of the one-armed type, or the connecting lever may be omitted altogether and the pin, fastened to the blade actuating ring, may be engaged directly by the cam groove of the motor element.

While the blade actuating ring is shown as equipped with a pin 28 and the corresponding end of the connecting lever slotted at 31a, this arrangement could conceivably be reversed, i. e., the blade actuating ring may be slotted, and a pin be mounted on the cooperating end of the connecting lever.

The shape of the cam groove itself may be modified depending upon the most important application of the shutter. If speed is of paramount importance, the top of the trapezoid may be shortened or may even be reduced to zero so that the shape of the cam becomes triangular. This will increase the speed of the shutter but will, of course, decrease its relative light admittance. Should, on the other hand, maximum efficiency or maximum light admittance over a given period of time be the main consideration, the top of the trapezoid or the dwell period of the shutter may be made longer. In this matter, a better efficiency may be obtained, but, of course, the highest speed thus obtainable will not be as high as before.

Various other modifications will readily present themselves to anybody skilled in the art, and it will be understood that modifications of this nature should be considered to fall within the scope of this invention.

What we claim as new is:

1. A photographic shutter comprising a blade assembly, a motor unit, a rewinding device and a release mechanism, said blade assembly including a housing, a number of pivoted blades, and a blade actuating member, said motor unit including a torsion spring, a fly wheel having a cam groove, one end of said spring being fastened to said wheel, a pin on said wheel cooperating with said release mechanism, and means, responsive to said cam groove, to operate said actuating member, said rewinding device comprising a unidirectionally rotatable body coaxial with said motor unit, the other end of said spring being fastened to said body, said body having a cam path consisting of a one revolution helix and a part, parallel to the axis of said body, connecting the two ends of said helix, said release mechanism including a plate depressible in a direction parallel to the axis of said motor unit, abutments to said plate forming a one revolution escapement for the pin on said fly wheel, means to keep said plate depressed after actuation, a projection from said plate adapted to engage the cam path of said rewinding device to form a sequence control so that the said spring cannot be rewound unless an exposure has been made and no exposure can be made unless said spring has been rewound.

2. A photographic shutter comprising a blade assembly, a motor unit, a rewinding device, and a release mechanism, said blade assembly including a housing, a number of pivoted blades, and a blade actuating member, said motor unit including a torsion spring, a fly wheel having a cam groove consisting of a straight part and a single trapezoid cam abutment, one end of said spring being fastened to said wheel, a pin on said wheel cooperating with said release mechanism, and means, responsive to said cam groove, to operate said actuating member, the straight part of said groove preceding said trapezoid cam abutment in operation, said rewinding device comprising a unidirectionally rotatable body coaxial with said motor unit, the other end of said spring being fastened to said body, said body having a cam path consisting of a one revolution helix and a part, parallel to the axis of said body, connecting the two ends of said helix, said release mechanism including a plate depressible in a direction parallel to the axis of said motor unit, abutments to said plate forming a one-revolution escapement for the pin on said fly wheel, means to keep said plate depressed after actuation, a projection from said plate adapted to engage the cam path of said rewinding device to form a sequence control so that the said spring cannot be rewound unless an exposure has been made and no exposure can be made unless said spring has been rewound.

3. A photographic shutter comprising a blade assembly, a motor unit, a rewinding device and a release mechanism, said blade assembly including a housing, a number of pivoted blades, and a blade actuating member, said motor unit including a torsion spring, a fly wheel having a cam groove consisting of a straight part and a single trapezoid cam abutment, one end of said spring being fastened to said wheel, a pin on said wheel cooperating with said release mechanism, and means, responsive to said cam groove, to operate said actuating member, the straight part of said groove preceding said trapezoid cam abutment in operation, said rewinding device comprising a unidirectionally rotatable body coaxial with said motor unit, the other end of said spring being fastened to said body, said body having a cam path consisting of a one-revolution helix and a part, parallel to the axis of said body, connecting the two ends of said helix, said release mechanism including a plate depressible in a direction parallel to the axis of said motor unit, abutments to said plate forming a one-revolution escapement for the pin on said fly wheel, means to keep said plate depressed after actuation, a projection from said plate adapted to engage the cam path of said rewinding device to form a sequence control so that the said spring cannot be rewound unless an exposure has been made and no exposure can be made unless said spring has been rewound, the momentum of inertia of the fly wheel, the force of the spring, and the length of the straight part of said cam groove being such that a time of at least ten milliseconds elapses between the release of said wheel and operation of said blade actuating member.

4. A photographic shutter comprising a blade assembly, a motor unit, a rewinding device and a release mechanism, said blade assembly including a housing, a number of pivoted blades, and a blade actuating member, said motor unit including a torsion spring, a fly wheel having a cam groove consisting of a straight part and a single trapezoid cam abutment, said straight part being at least four times as long as the base of said cam abutment, one end of said spring being fastened to said wheel, a pin on said wheel cooperating with said release mechanism, and means, responsive to said cam groove, to operate said actuating member, the straight part of said groove preceding said trapezoid cam abutment in operation, said rewinding device comprising a unidirectionally rotatable body coaxial with said motor unit, the other end of said spring being fastened to said body, said body having a cam path consisting of a one-revolution helix and a part, parallel to the axis of said body, connecting the two ends of said helix, said release mechanism including a plate depressible in a direction parallel to the axis of said motor unit, abutments to said plate forming a one-revolution escapement for the pin on said fly wheel, means to keep said plate depressed after actuation, a projection from said plate adapted to engage the cam path of said rewinding device to form a sequence control so that the said spring cannot be rewound unless an exposure has been made and no exposure can be made unless said spring has been rewound.

5. A photographic shutter comprising a blade assembly, a motor unit, a rewinding device and a release mechanism, said blade assembly including a housing, a number of pivoted blades, and a blade actuating member, said motor unit including a torsion spring, a fly wheel having a cam groove, one end of said spring being fastened to said wheel, a pin on said wheel cooperating with said release mechanism, a lever, and a fixed fulcrum for said lever disposed between said blade assembly and said motor unit, one end of said lever being responsive to said cam groove, and the other end of said lever being adapted to operate said member, the distance between the end of the lever cooperating with the cam groove and the fulcrum being shorter than the distance between the fulcrum and the other end of the lever operating the said member, said rewinding device comprising a unidirectionally rotatable body coaxial with said motor unit, the other end of said spring being fastened to said body, said body having a cam path consisting of a one-revolution helix and a part, parallel to the axis of said body, connecting the two ends of said helix, said release mechanism including a plate depressible in a direction parallel to the axis of said motor unit, abutments to said plate forming a one-revolution escapement for the pin on said fly wheel, means to keep said plate depressed after actuation, a projection from said plate adapted to engage the cam path of said rewinding device to form a sequence control so that the said spring cannot be rewound unless an exposure has been made and no exposure can be made unless said spring has been rewound.

ALFRED SIMMON.
LOUIS L. WEISGLASS.